Feb. 28, 1928.
J. B. NEAL
1,660,346
ESCUTCHEON PLATE
Filed Dec. 17, 1925
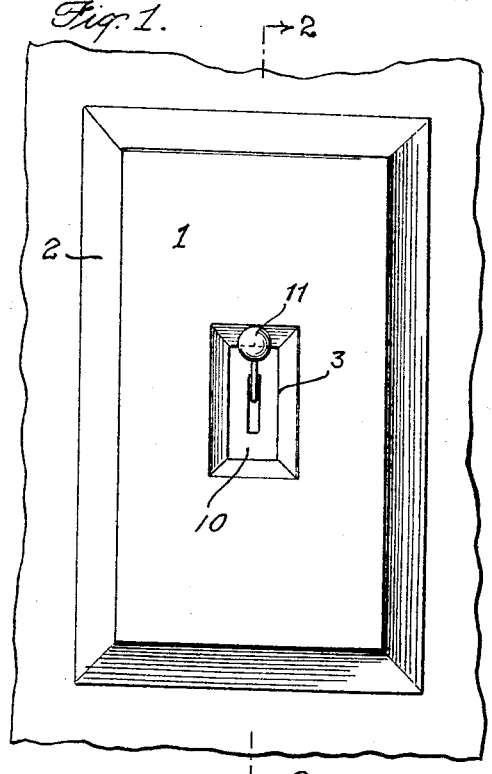
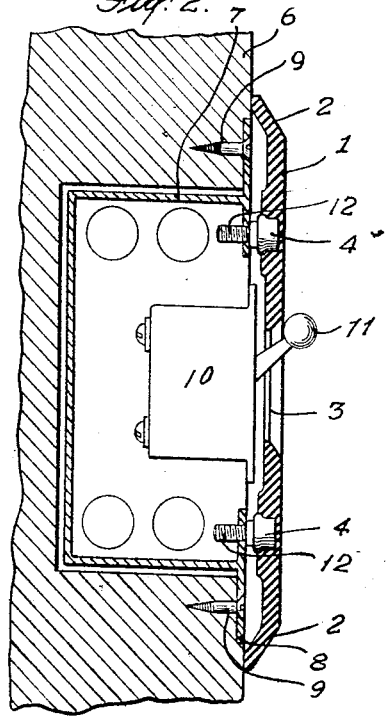
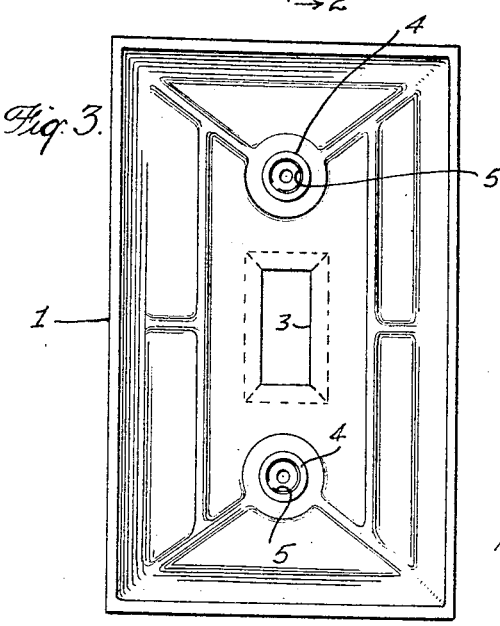
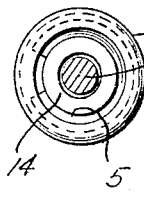
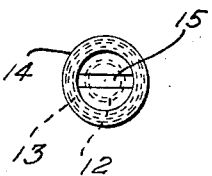
INVENTOR
JAMES B. NEAL
BY
Newell & Spencer
ATTORNEYS Patented Feb. 28, 1928.

1,660,346

UNITED STATES PATENT OFFICE.

JAMES B. NEAL, OF LOCKPORT, NEW YORK, ASSIGNOR TO NORTON LABORATORIES, INC., OF LOCKPORT, NEW YORK, A CORPORATION OF MAINE.

ESCUTCHEON PLATE.

Application filed December 17, 1925. Serial No. 75,943.

This invention relates to escutcheon plates and more particularly to escutcheon plates which can be readily removed without extensive use of tools.

Escutcheon plates for wall outlets, and particularly for electrical outlets and switches, are made of metal or, in some cases, molded materials. They are usually fastened by means of screws passing through the escutcheon plate and engaging in tapped holes in the outlet box assembly or other analogous structure. This method of semi-permanent fastening is open to a number of disadvantages. In the first place, the plate is not readily removable as, in general, two or more screws must first be removed and this is quite a serious problem in many cases as escutcheon plates, particularly those covering outlets of base plugs, are frequently behind pieces of furniture or in corners where they are hard to get at and the removal by unscrewing is a difficult and disagreeable task and always entails the possibility of losing the screws.

As a result, escutcheon plates are practically never removed and, where they are made of metal or other material requiring polishing, they are either neglected or polished on the wall which is likewise frequently a difficult and disagreeable operation and presents the danger of polish getting on the wall immediately surrounding the escutcheon plates. The screw-heads are also a source of ugliness and are particularly ugly in the case of escutcheon plates made of molded material, such as phenolic condensate compositions, and the like, which are usually colored. Escutcheon plates of molded material are also liable to breakage by to great tightening of the screws as the plates are generally thin around the screw holes which must necessarily be countersunk.

Screw fastening escutcheon plates are also open to serious disadvantage, particularly in case of escutcheon plates of molded materials, in that it is difficult to mount them flat against a wall for the reason that outlet boxes, especially those of large dimensions for a plurality of outlets are seldom set perfectly true in the wall and any departure from true setting makes it difficult to fit the escutcheon plates flat or necessitates compensating for inaccuracies by causing the escutcheon plates to bend when screwed tight. In the case of molded material, this is very apt to crack the plate and even in the case of metal plates, the warping is a serious disadvantage. The time lost in fitting escutcheon plates is also very much greater where irregularity in outlet box setting must be compensated for.

The principal object of the present invention is to remove the disadvantages inherent in escutcheon plates hitherto used and to provide an escutcheon plate structure and fastening means which permits ready removal of the escutcheon plate without loosening of screws or other permanent fastening and which does not tend to crack escutcheon plates of molded material. A further object of the present invention consists in the provision of escutcheon plates which are free from disfiguring screw holes.

With these and other objects in view, the present invention comprises escutcheon plates and corresponding outlet box assembly provided with detachable fasteners so that the escutcheon plates may be removed by hand or with the aid of a flat tool to pry up the plate. Any fastening which is detachable by a pull, either straight or at an angle, may be used and will be referred to generically in the specification as "snap fasteners".

The invention will be illustrated by the following more detailed description of a molded escutcheon plate for a toggle switch provided with modified glove snap fasteners, but it should be understood that the invention is not limited to the specific details set forth and other types of escutcheon plates and snap fasteners are included in the invention. Glove snap fasteners and similar fasteners, which permit the use of a screw threaded stud, constitute the preferred embodiment of the present invention and possess numerous advantages which will be apparent from the following description taken in connection with the drawings:

Fig. 1 is a front elevation of an escutcheon plate mounted in place;

Fig. 2 is a vertical cross-section through the escutcheon plate and outlet box taken along the line 2—2 of Fig. 1;

Fig. 3 is a rear elevation of the escutcheon plate removed from the wall;

Fig. 4 is a detailed cross-section through the fastening means;

Fig. 5 is a cross-section at right angles to Fig. 4 along 5—5; and

Fig. 6 is a plan view of the head of the fastening stud shown in Figs. 2 and 4.

The escutcheon plate 1 of molded phenolic condensate is provided with the bevelled edges 2 which contact with the wall and provide sufficient clearance between the wall and the raised portion of the plate to accommodate the fastening means. A rectangular aperture 3 with bevelled edges is provided through which the toggle switch lever 11 projects.

The escutcheon plate is further equipped with molded glove fasteners 4 of the usual type, containing spring rings 5.

The outlet box 7, carrying the switch 10, is mounted in a recess in the wall 6 in the usual manner, being held by screws 9 which clamp shoulders 8 against the wall. The outlet box assembly is tapped for the screws 12 in the usual manner but, instead of providing ordinary machine screws for fastening the escutcheon plate, fastening stud screws 12 are provided with slotted heads 13 and spring caps 14 conforming to the contour of the head and slot 15. The two studs are screwed in until their heads almost touch the shoulder of the outlet box, leaving, however, a slight clearance for fine adjustment. The plate 1 is then snapped on to the fasteners and if it is not quite level and flush with the wall, the fasteners may be screwed in or out a sufficient amount to compensate for any uneven mounting of the outlet box. If desired, locking means, such as lock nuts, may be provided for holding adjustment of the fasteners but, in most cases, this is unnecessary as the fasteners are not subjected to any twisting strains. The escutcheon plate is finally snapped on flush to the wall as shown in Fig. 2 and can be readily removed and replaced either by hand or by the aid of a screw-driver or knife-blade to pry one of the edges. The escutcheon plate presents a perfectly smooth surface on the outside with no disfiguring screw holes or screw-heads showing and can be easily removed for replacement or cleaning.

Owing to the fact that the plate is not screwed tightly against the wall, it is not subjected to strain and there is little or no tendency for the molded plate to break. This permits the use of much more delicate materials which may be desirable for certain purposes and which have hitherto been impracticable, owing to their lack of mechanical strength.

Metal plates may be substituted for the molded plate shown in the drawings and the method of fastening of the present invention is equally advantageous with metal plates.

The escutcheon plates of the present invention may be applied to any of the ordinary outlet box assemblies by simply substituting a fastening stud screw for the ordinary machine screw hitherto used and, owing to the flexibility of the fastening, many modifications of structure may be availed of. For example, where space in the outlet box is at a premium, the wood screws 9 can be provided with fastening heads to co-operate with fasteners near the edges of the escutcheon plate and many other advantageous structural modifications may be obtained by means of the present invention and are included in its scope.

What I claim as new is:

An outlet box and escutcheon plate structure comprising an outlet box assembly provided with a plurality of tapped holes, screws provided with glove fastener heads adapted to screw into the tapped holes of the outlet box assembly, an escutcheon plate having incorporated therein glove fasteners spaced to correspond with the tapped holes on the outlet box assembly and adapted to cooperate with the fastener heads on the screws.

Signed at Lockport, New York, this 14th day of December, 1925.

JAMES B. NEAL.